(12) United States Patent
Tips

(10) Patent No.: US 7,785,080 B2
(45) Date of Patent: Aug. 31, 2010

(54) DOWNHOLE RAM PUMP

(75) Inventor: Timothy R. Tips, Montgomery, TX (US)

(73) Assignee: Welldynamics, Inc., Spring, TX (US)

( * ) Notice: Subject to any disclaimer, the term of this patent is extended or adjusted under 35 U.S.C. 154(b) by 1128 days.

(21) Appl. No.: 11/442,888

(22) Filed: May 30, 2006

(65) Prior Publication Data

US 2006/0266513 A1 Nov. 30, 2006

(30) Foreign Application Priority Data

May 31, 2005 (WO) ................ PCT/US2005/19087

(51) Int. Cl.
*F04B 17/02* (2006.01)
*F04B 47/08* (2006.01)
*E21B 43/00* (2006.01)

(52) U.S. Cl. .................. 417/334; 417/375; 91/235; 91/325; 166/105

(58) Field of Classification Search ................ 417/328, 417/334, 375; 91/235, 325; 166/105
See application file for complete search history.

(56) References Cited

U.S. PATENT DOCUMENTS

| | | | |
|---|---|---|---|
| 1,885,820 A | 11/1932 | Gothard, et al. | |
| 2,895,063 A | 7/1959 | Morris | |
| 2,960,109 A | 11/1960 | Wilson | |
| 3,342,267 A | 9/1967 | Cotter et al. | |
| 3,398,302 A | 8/1968 | Harnau et al. | |
| 3,663,845 A | 5/1972 | Apstein | |
| 3,766,399 A | 10/1973 | Demetrescu | |
| 3,772,541 A | 11/1973 | Campagnuolo et al. | |
| 3,968,387 A | 7/1976 | Scarff | |
| 3,970,877 A | 7/1976 | Russell et al. | |
| 4,009,756 A * | 3/1977 | Zehren ................... | 166/250.15 |
| 4,015,234 A | 3/1977 | Krebs | |

(Continued)

FOREIGN PATENT DOCUMENTS

GB 2044822 10/1980

(Continued)

OTHER PUBLICATIONS

International Preliminary Report on Patentability and Written Opinion issued for PCT/US2005/019087 dated Dec. 21, 2007 (5 pages).

(Continued)

*Primary Examiner*—Charles G Freay
(74) *Attorney, Agent, or Firm*—Marlin R. Smith

(57) ABSTRACT

A downhole ram pump. A downhole pump system includes a flow restricting device which variably restricts fluid flow through an opening, the restricting device vibrating in response to the fluid flow, thereby alternately increasing and decreasing the fluid flow through the opening; and a pump device which generates a pressure differential in response to vibration of the restricting device. Another downhole pump system includes a flow restricting device which vibrates in response to fluid flow through an opening, thereby alternately increasing and decreasing the fluid flow through the opening, a pressure differential across the restricting device variably biasing the restricting device to increasingly restrict the fluid flow through the opening, and the pressure differential alternately increasing and decreasing in response to respective alternate increasing and decreasing flow through the opening; and a pump device which generates differential pressure in response to vibration of the restricting device.

20 Claims, 3 Drawing Sheets

U.S. PATENT DOCUMENTS

| | | | |
|---|---|---|---|
| 4,047,832 A | 9/1977 | Sforza | |
| 4,215,426 A | 7/1980 | Klatt | |
| 4,362,106 A | 12/1982 | Campagnuolo et al. | |
| 4,387,318 A | 6/1983 | Kolm et al. | |
| 4,415,823 A | 11/1983 | Jurgens | |
| 4,416,000 A | 11/1983 | Scherbatskoy | |
| 4,464,939 A | 8/1984 | Corpron | |
| 4,467,236 A | 8/1984 | Kolm et al. | |
| 4,491,738 A | 1/1985 | Kamp | |
| 4,536,674 A | 8/1985 | Schmidt | |
| 4,540,348 A * | 9/1985 | Soderberg | 417/383 |
| 4,627,294 A | 12/1986 | Lew | |
| 4,674,397 A * | 6/1987 | Wilcox | 91/235 |
| 4,769,569 A | 9/1988 | Stahlhuth | |
| 4,808,874 A | 2/1989 | Stahlhuth | |
| 4,825,421 A | 4/1989 | Jeter | |
| 4,858,644 A | 8/1989 | Decker | |
| 5,101,907 A | 4/1992 | Schultz et al. | |
| 5,202,194 A | 4/1993 | VanBerg, Jr. | |
| 5,295,397 A | 3/1994 | Hall et al. | |
| 5,547,029 A | 8/1996 | Rubbo et al. | |
| 5,554,922 A | 9/1996 | Kunkel | |
| 5,626,200 A | 5/1997 | Gilbert et al. | |
| 5,703,474 A | 12/1997 | Smalser | |
| 5,801,475 A | 9/1998 | Kimura | |
| 5,839,508 A | 11/1998 | Tubel et al. | |
| 5,899,664 A | 5/1999 | Lawrence | |
| 5,907,211 A | 5/1999 | Hall et al. | |
| 5,957,208 A | 9/1999 | Schnatzmeyer | |
| 5,965,964 A | 10/1999 | Skinner et al. | |
| 5,979,558 A | 11/1999 | Bouldin et al. | |
| 5,995,020 A | 11/1999 | Owens et al. | |
| 6,011,346 A | 1/2000 | Buchanan et al. | |
| 6,020,653 A | 2/2000 | Woodbridge et al. | |
| 6,112,817 A | 9/2000 | Voll et al. | |
| 6,179,052 B1 | 1/2001 | Purkis et al. | |
| 6,217,284 B1 | 4/2001 | Lawrence | |
| 6,325,150 B1 | 12/2001 | Rayssiguier | |
| 6,351,999 B1 | 3/2002 | Maul et al. | |
| 6,371,210 B1 | 4/2002 | Bode et al. | |
| 6,424,079 B1 | 7/2002 | Carroll | |
| 6,470,970 B1 | 10/2002 | Purkis et al. | |
| 6,478,091 B1 | 11/2002 | Gano | |
| 6,504,258 B2 | 1/2003 | Schultz et al. | |
| 6,554,074 B2 | 4/2003 | Longbottom | |
| 6,567,013 B1 | 5/2003 | Purkis et al. | |
| 6,567,895 B2 | 5/2003 | Scales | |
| 6,575,237 B2 | 6/2003 | Purkis et al. | |
| 6,585,051 B2 | 7/2003 | Purkis et al. | |
| 6,607,030 B2 | 8/2003 | Bauer et al. | |
| 6,644,412 B2 | 11/2003 | Bode et al. | |
| 6,659,184 B1 | 12/2003 | Tips et al. | |
| 6,672,382 B2 | 1/2004 | Schultz | |
| 6,672,409 B1 | 1/2004 | Dock et al. | |
| 6,717,283 B2 | 4/2004 | Skinner et al. | |
| 6,768,214 B2 | 7/2004 | Schultz et al. | |
| 6,786,285 B2 | 9/2004 | Johnson et al. | |
| 6,874,361 B1 | 4/2005 | Meltz et al. | |
| 6,914,345 B2 | 7/2005 | Webster | |
| 6,920,085 B2 | 7/2005 | Finke et al. | |
| 7,086,471 B2 | 8/2006 | Cantin et al. | |
| 2002/0096887 A1 | 7/2002 | Schultz et al. | |
| 2005/0051323 A1 | 3/2005 | Fripp et al. | |
| 2005/0230973 A1 | 10/2005 | Fripp et al. | |
| 2005/0230974 A1 | 10/2005 | Masters et al. | |
| 2006/0064972 A1 | 3/2006 | Allen | |

FOREIGN PATENT DOCUMENTS

| | | |
|---|---|---|
| WO | WO 01/39284 | 5/2001 |
| WO | WO 02/10553 | 2/2002 |
| WO | WO 02/057589 | 7/2002 |

OTHER PUBLICATIONS

Office Action issued for U.S. Appl. No. 11/346,738, dated Feb. 20, 2008 (32 pages).
International Preliminary Report on Patentability and Written Opinion issued for International Patent Application No. PCT/US2005/029007 dated Feb. 28, 2008 (5 pages).
Office Action issued Mar. 16, 2009, for U.S. Appl. No. 11/346,738, 17 pages.
Official Action issued Mar. 5, 2009, by the Canadian Intellectual Property Office for Canadian Patent Application Serial No. 2,596,408, 2 pages.
Office Action issued Apr. 6, 2009, with English translation for Russian Patent Application Serial No. 2008110087, 3 pages.
U.K. Search Report for application No. GB 0419933.7.
International Search Report for PCT/US2005/019087.
International Search Report for PCT/US2005/029007.
Written Opinion for PCT/US2005/029007.
International Search Report for PCT/US2005/003928.
Written Opinion for PCT/US2005/003928.
International Search Report for PCT/US2005/003911.
Written Opinion for PCT/US2005/003911.
Baker Oil Tools, "Flow Control Systems", undated.
"Extracting Energy From Natural Flow", NASA Tech Briefs, Spring 1980, vol. 5, No. 1, MFS-23989.
Blevins, Robert, "Flow induced vibration", Van Nostrand Reinhold Co., N.Y., 1977; Chapters 3 and 4.
Jaffe, B., Cook, W. R., Jaffe, H., "Piezoelectric Ceramics", Marietta: R.A.N. Publishers, 1971; Chapters 1, 2 and 12.
Journal of Hydraulic Engineering, "Sediment Management with Submerged Vanes. 1: Theory", vol. 117, dated Mar. 1991.
McGraw-Hill, Inc., "Fluid Mechanics", dated 1979, 1986.
Office Action for U.S. Appl. No. 10/658,899 dated Sep. 14, 2005.
Office Action for U.S. Appl. No. 10/658,899 dated Feb. 23, 2006.
Office Action for U.S. Appl. No. 10/825,350 dated Oct. 31, 2005.
Office Action for U.S. Appl. No. 10/825,350 dated Mar. 10, 2006.
Office Action for U.S. Appl. No. 10/826,952 dated Dec. 6, 2005.
U.S. Appl. No. 11/346,738, filed Feb. 3, 2006.
U.S. Appl. No. 11/346,908, filed Feb. 3, 2006.
Advisory Action issued May 26, 2009, for U.S. Appl. No. 11/346,738, 7 pages.
Examination Report for UK Application serial No. GB0419933.7.
Office Action dated Aug. 28, 2006 for U.S. Appl. No. 10/826,952.
Canadian Office Action issued Aug. 4, 2009, for Canadian Patent Application Serial No. 2,610,365, 2 pages.
US Office Action issued Sep. 3, 2009, for U.S. Appl. No. 11/346,738, 13 pages.
Office Action issued Feb. 23, 2010, for U.S. Appl. No. 11/346,738, 14 pages.

* cited by examiner

DOWNHOLE RAM PUMP

BACKGROUND

The present invention relates generally to equipment utilized and operations performed in conjunction with subterranean wells and, in an embodiment described herein, more particularly provides a downhole ram pump.

A wide variety of downhole well tools may be utilized which are hydraulically operated. For example, flow control devices, packers, plugs, etc. are available, and others may be developed in the future, which use pressure in performing their respective functions.

In the past, the most common methods of supplying hydraulic pressure to well tools were use of well fluid pressure, and transmission of pressure through control lines extending large distances from a remote location, such as the earth's surface or another location in the well. However, well fluids usually contain debris which can cause a malfunction in a well tool, and pressure in a well fluctuates and is difficult to predict and control. Control lines are relatively expensive and time-consuming to install, and are subject to damage during installation.

Therefore, it may be seen that it would be very beneficial to be able to generate hydraulic pressure downhole, e.g., in relatively close proximity to a well tool which is operated using the pressure. This would preferably eliminate the need for using well fluid pressure to operate the well tool, and would preferably eliminate the need to extend control lines large distances in the well.

SUMMARY

In carrying out the principles of the present invention, a downhole pump system is provided which solves at least one problem in the art. One example is described below in which flow through a tubular string is used to operate a downhole pump device, thereby generating a differential pressure for use in operating a well tool.

In one aspect of the invention, a downhole pump system is provided which includes a flow restricting device which variably restricts fluid flow through an opening. The restricting device vibrates in response to the fluid flow. The restricting device thereby alternately increases and decreases the fluid flow through the opening. A pump device generates differential pressure in response to vibration of the restricting device.

In another aspect of the invention, a downhole pump system includes a flow restricting device which vibrates in response to fluid flow through an opening. The restricting device thereby alternately increases and decreases the fluid flow through the opening. A pressure differential across the restricting device variably biases the restricting device to increasingly restrict the fluid flow through the opening. The pressure differential alternately increases and decreases in response to respective alternate increasing and decreasing flow through the opening. A pump device generates differential pressure in response to vibration of the restricting device.

These and other features, advantages, benefits and objects of the present invention will become apparent to one of ordinary skill in the art upon careful consideration of the detailed description of representative embodiments of the invention hereinbelow and the accompanying drawings.

DETAILED DESCRIPTION

Figure 1:
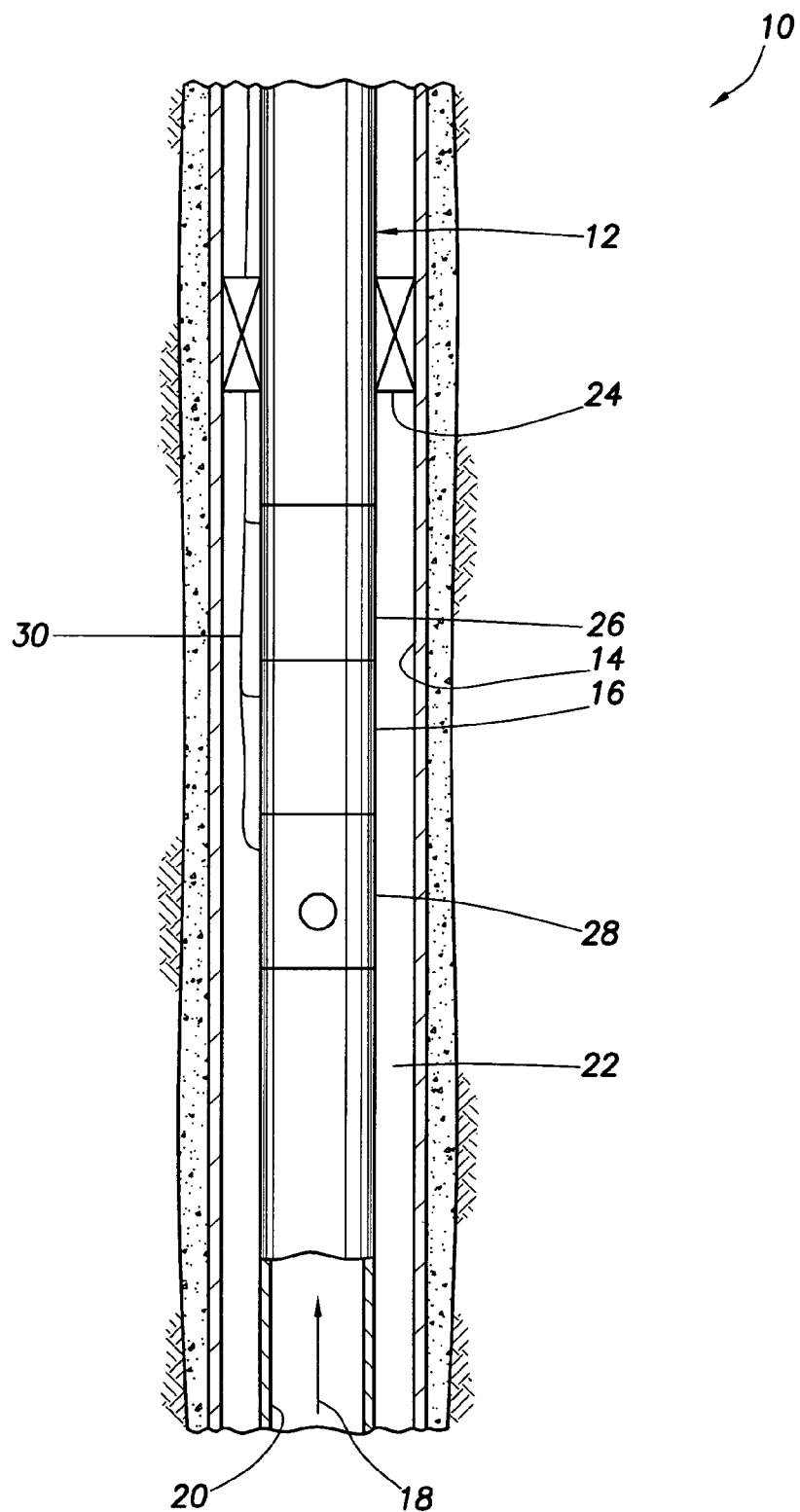
FIG. 1 is a schematic partially cross-sectional view of a pump system embodying principles of the present invention.

Representatively illustrated in FIG. 1 is a downhole pump system 10 which embodies principles of the present invention. In the following description of the system 10 and other apparatus and methods described herein, directional terms, such as "above", "below", "upper", "lower", etc., are used for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

As depicted in FIG. 1, a tubular string 12 (such as a production, injection, drill, test or coiled tubing string) has been installed in a wellbore 14. A pump 16 is interconnected in the tubular string 12. The pump 16 generates differential pressure from flow of fluid (represented by arrow 18) through an internal flow passage 20 of the tubular string 12.

The fluid 18 is shown in FIG. 1 as flowing upwardly through the tubular string 12 (as if the fluid is being produced), but it should be clearly understood that a particular direction of flow is not necessary in keeping with the principles of the invention. The fluid 18 could flow downwardly (as if being injected) or in any other direction. Furthermore, the fluid 18 could flow through other passages (such as an annulus 22 formed radially between the tubular string 12 and the wellbore 14) to operate the pump 16, if desired.

The pump 16 is illustrated in FIG. 1 as being connected to various well tools 24, 26, 28 via fluid lines 30 external to the tubular string 12. These lines 30 could instead, or in addition, be positioned within the passage 20 or in a sidewall of the tubular string. As another alternative, the well tools 24, 26, 28 (or any combination of them) could be integrally formed with the pump 16, for example, so that the lines 30 may not be used at all, or the lines could be integral to the construction of the pump and well tool(s).

The well tool 24 is depicted in FIG. 1 as being a pressure set packer. For example, elevated pressure supplied via the lines 30 could be used to operate an actuator to set the packer, or the elevated pressure could be used to operate a valve to control application of well pressure to a setting mechanism, etc.

The well tool 26 could be any type of well tool, such as a flow control device, sampler, telemetry device, plug, etc. The well tool 26 could also be representative of instrumentation for another well tool, such as a control module, actuator, etc. for operating another well tool. As another alternative, the well tool 26 could be one or more accumulators used to store pressure for operating other well tools.

The well tool 28 is depicted in FIG. 1 as being a flow control device, such as a sliding sleeve valve or variable choke. The well tool 28 is used to control flow between the passage 20 and the annulus 22. Alternatively, the well tool 28 could be a flow control device which controls flow in the passage 20, such as a safety valve.

Although certain types of well tools 24, 26, 28 are described above as being operated using pressure generated by the pump 16, it should be clearly understood that the invention is not limited to use of the pump 16 with any particular type of well tool. The invention is also not limited to any particular type of well installation or configuration.

Figure 2:
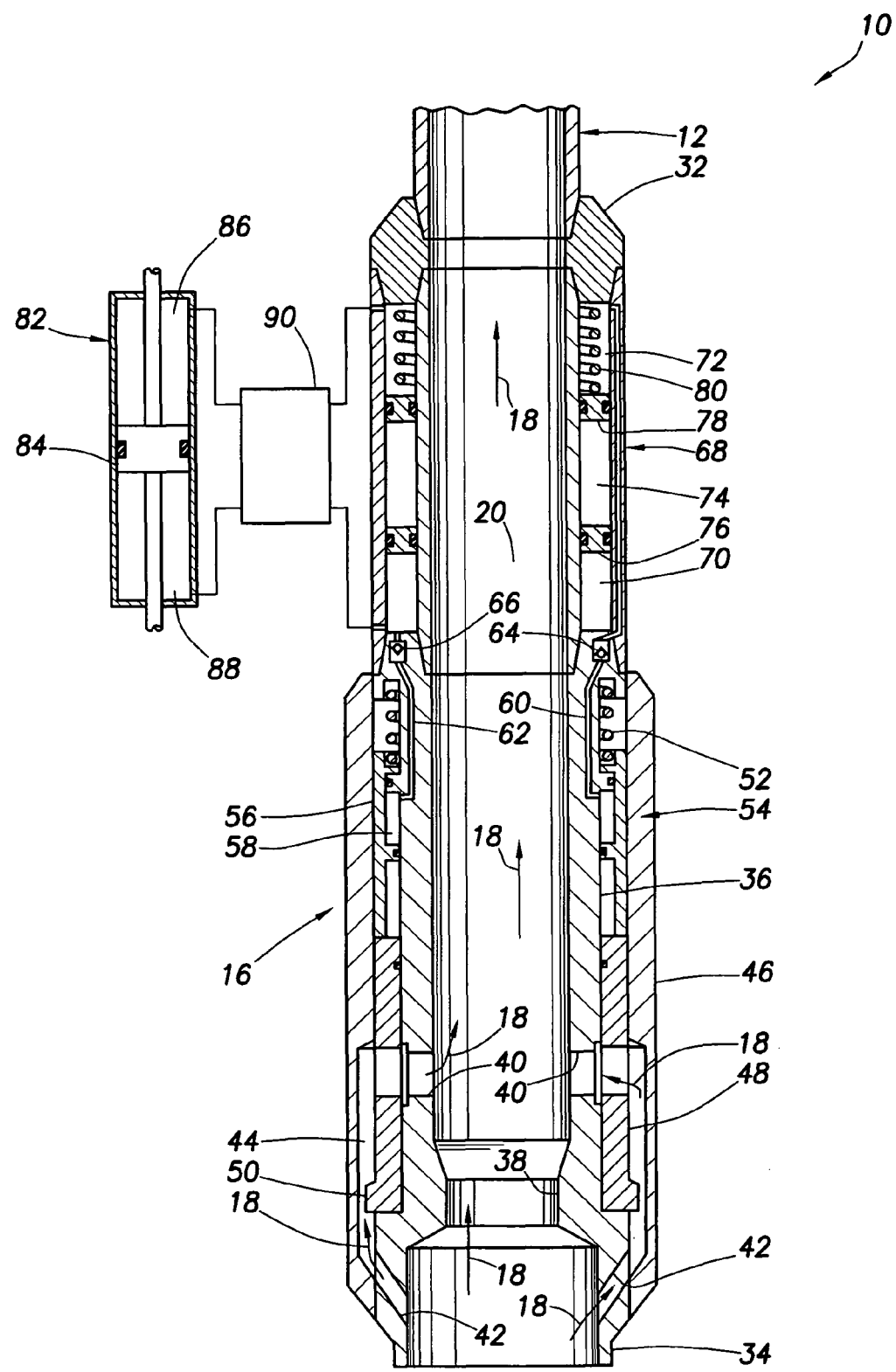
FIG. 2 is an enlarged scale schematic cross-sectional view of a pump which may be used in the system of FIG. 1.

Referring additionally now to FIG. 2 an enlarged scale schematic cross-sectional view of the pump 16 is representatively illustrated. The pump 16 is shown apart from the remainder of the system 10, it being understood that in use the pump would preferably be interconnected in the tubular string 12 at upper and lower end connections 32, 34 so that the passage 20 extends through the pump.

Accordingly, in the system 10 the fluid 18 flows upwardly through the passage 20 in the pump 16. The fluid 18 could flow in another direction (such as downwardly through the passage 20, etc.) if the pump 16 is used in another system.

The passage 20 extends through a generally tubular housing 36 of the pump 16. The housing 36 may be a single tubular member or it may be an assembly of separate components.

Note that the housing 36 includes a flow restriction 38 in the form of a venturi in the passage 20. As the fluid 18 flows through the restriction 38, a pressure differential is created, in a manner well understood by those skilled in the art. Pressure in the passage 20 upstream of the restriction 38 will, therefore, be greater than pressure downstream of the restriction.

The housing 36 also includes openings 40 formed through its sidewall downstream of the restriction 38, and openings 42 formed through its sidewall upstream of the restriction. An annular chamber 44 formed between the housing 36 and an outer housing 46 is in communication with each of the openings 40, 42. Thus, instead of flowing directly through the restriction 38, a portion of the fluid 18 is induced by the pressure differential in the passage 20 to flow through the openings 42 upstream of the restriction 38 to the chamber 44, and from the chamber through the openings 40 back into the passage 20 downstream of the restriction.

A flow restricting device 48 is positioned in the chamber 44. The device 48 operates to variably restrict flow through the openings 40, for example, by varying an unobstructed flow area through the openings. The device 48 is illustrated as a sleeve, but other configurations, such as needles, cages, plugs, etc., could be used in keeping with the principles of the invention.

As depicted in FIG. 2, the openings 40 are fully open, permitting relatively unobstructed flow through the openings. If, however, the device 48 is displaced upwardly, the flow area through the openings 40 will be increasingly obstructed, thereby increasingly restricting flow through the openings.

The device 48 has an outwardly extending annular projection 50 formed thereon which restricts flow through the chamber 44. Because of this restriction, another pressure differential is created in the chamber 44 between upstream and downstream sides of the projection 50. As the fluid 18 flows through the chamber 44, the pressure differential across the projection 50 biases the device 48 in an upward direction, that is, in a direction which operates to increasingly restrict flow through the openings 40.

Upward displacement of the device 48 is resisted by a biasing device 52, such as a coil spring, gas charge, etc. The biasing device 52 applies a downwardly directed biasing force to the device 48, that is, in a direction which operates to decreasingly restrict flow through the openings 40.

If the force applied to the device 48 due to the pressure differential across the projection 50 exceeds the biasing force applied by the biasing device 52, the device 48 will displace upward and increasingly restrict flow through the openings 40. If the biasing force applied by the biasing device 52 to the device 48 exceeds the force due to the pressure differential across the projection 50, the device 48 will displace downward and decreasingly restrict flow through the openings 40.

Note that if flow through the openings 40 is increasingly restricted, then the pressure differential across the projection 50 will decrease and less upward force will be applied to the device 48. If flow through the openings is less restricted, then the pressure differential across the projection 50 will increase and more upward force will be applied to the device 48.

Thus, as the device 48 displaces upward, flow through the openings 40 is further restricted, but less upward force is applied to the device. As the device 48 displaces downward, flow through the openings 40 is less restricted, but more upward force is applied to the device. Preferably, this alternating of increasing and decreasing forces applied to the device 48 causes a vibratory up and down displacement of the device relative to the housing 36.

A pump device 54 uses this vibratory displacement of the device 48 to generate differential pressure. An annular piston 56 is connected to the device 48 so that it displaces with the device 48. The piston 56 could be integrally formed with the device 48, or it could be separately formed and then connected to the device.

Displacement of the piston 56 causes an annular pump chamber 58 to change volume. As the piston 56 displaces upward, the pump chamber 58 volume decreases. As the piston 56 displaces downward, the pump chamber 58 volume increases.

Input and output lines 60, 62 are connected to the pump chamber 58. A check valve 64 interconnected in the input line 60 only permits flow through the line into the pump chamber 58. Another check valve 66 interconnected in the output line 62 only permits flow through the line out of the pump chamber 58.

Thus, as the piston 56 displaces upward, the volume of the chamber 58 decreases and fluid in the chamber is forced to flow out of the chamber through the output line 62. As the piston 56 displaces downward, the volume of the chamber 58 increases and fluid is drawn into the chamber through the input line 60. Preferably, the piston 56 continuously displaces alternately upward and downward with the device 48 while the fluid 18 flows through the passage 20, so that fluid is pumped through the chamber 58 (i.e., into the chamber via the line 60 and out of the chamber via line 62) while the fluid 18 flows through the passage 20.

The pump device 54 is connected to an accumulator device 68. Specifically, the line 62 is connected to an annular chamber 70, and the line 60 is connected to another annular chamber 72. The pump device 54 and accumulator device 68 could be combined into a single assembly, or they could be separately constructed and then either connected directly to each other or remotely connected to each other.

Another annular chamber 74 is separated from the chamber 70 by a floating annular piston 76. The chamber 74 is also separated from the chamber 72 by another floating annular piston 78. Preferably, a compressible fluid (such as nitrogen gas, etc.) is contained in the chamber 74.

The accumulator device 68 also includes a biasing device 80 (such as a coil spring, etc.). The biasing device 80 applies a biasing force to the piston 78, which operates to maintain a pressure differential across the piston. As will be appreciated by those skilled in the art, the force applied to one side of the piston 78 by pressure in the chamber 72 and by the biasing device 80 will equal the force applied to the other side of the piston by pressure in the chamber 74.

Thus, at a state of equilibrium, the pressure in the chamber 72 will preferably be less than the pressure in the chamber 74. In addition, at the state of equilibrium, pressure in the chamber 70 will equal pressure in the chamber 74. However, it should be clearly understood that other pressures and pressure relationships may be used in keeping with the principles of the invention.

The pump device 54 and accumulator device 68 utilize a principle known to those skilled in the art as a "ram pump." The momentum of the moving components (the device 48, piston 56 and fluid moving through the line 62) operate to increase the pressure of the fluid in the chamber 70 of the accumulator device 68 when the piston 56 is displacing upward. Similarly, the momentum of the moving components operate to decrease the pressure of the fluid in the chamber 72 of the accumulator device 68 when the piston 56 is displacing downward. Thus, an increased pressure differential between the chambers 70, 72 is achieved using this principle. The chamber 74 provides an effective compressible "cushion" for the introduction of fluid into the chamber 70 and the withdrawal of fluid from the chamber 72 during operation of the pump device 54.

As described above, pressure in the chamber 70 will be elevated relative to pressure in the chamber 72 during operation of the pump device 54. This pressure differential may be used to operate an actuator 82 for a well tool. The actuator 82 is depicted in FIG. 2 as including a cylindrical piston 84 separating chambers 86, 88 but it should be clearly understood that any type of actuator may be used in keeping with the principles of the invention.

The actuator 82 is merely an example of a manner in which elevated pressure generated by the pump 16 may be used to operate a well tool. For example, the actuator 82 could be used to set the well tool 24, or displace a closure device of the well tool 28, or otherwise operate the well tool 26, etc. In addition, elevated pressure, reduced pressure, or differential pressure generated by the pump 16 may be used in any manner, and in systems other than the system 10, in keeping with the principles of the invention.

A control module 90 may be interconnected between the chambers 86, 88 of the actuator 82 and the chambers 70, 72 of the accumulator device 68. The control module 90 may be used to control how and when the various chambers 70, 72, 86, 88 are placed in communication with each other. The control module 90 may be operated remotely via telemetry (such as electrical, pressure pulse, acoustic, electromagnetic, optical or other form of telemetry) and/or the control module may be operated in response to local stimulus, such as outputs of sensors, etc.

Figure 3:
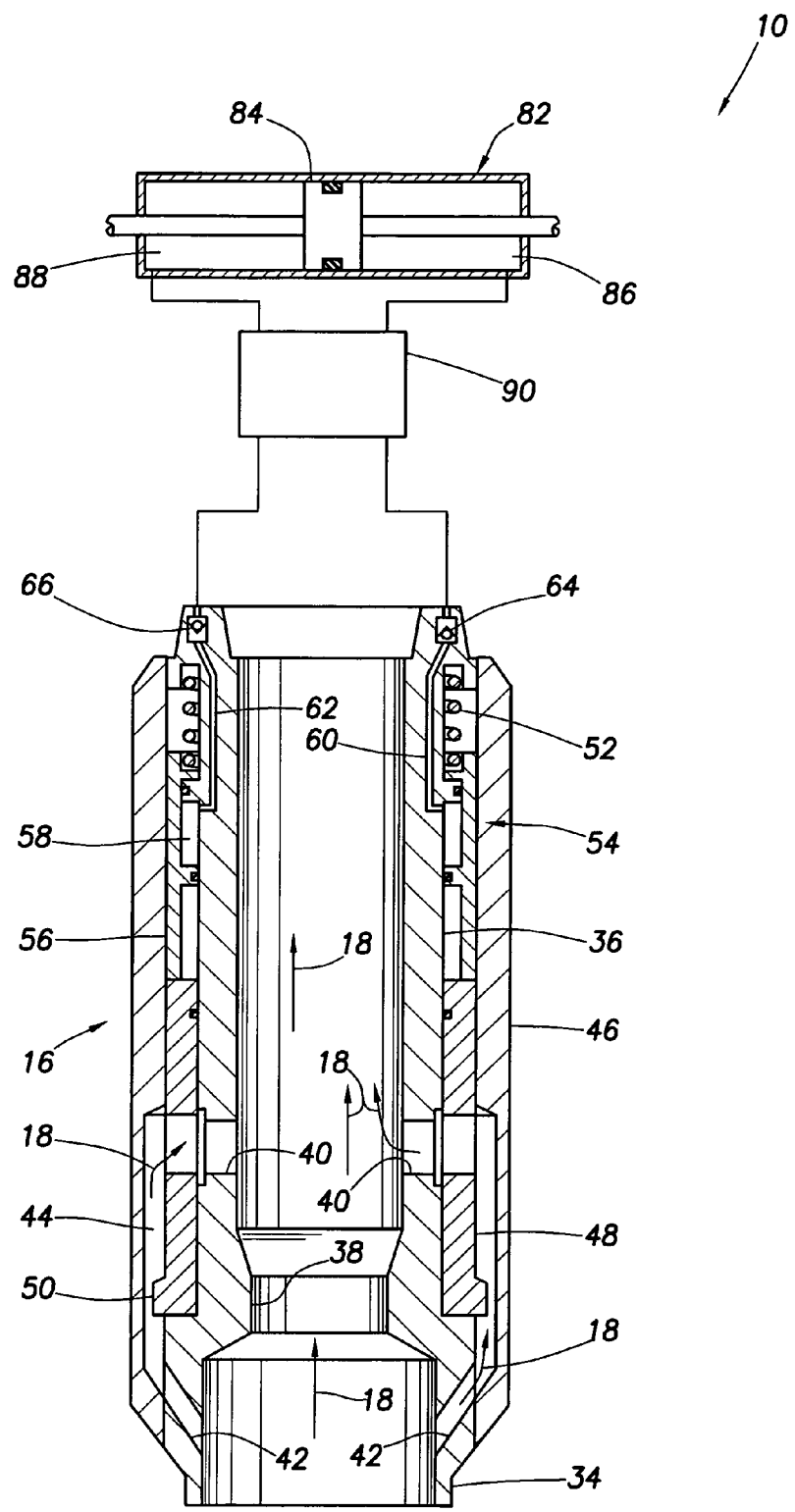
FIG. 3 is a schematic cross-sectional view of an alternate configuration of the pump of FIG. 2.

Referring additionally now to FIG. 3, another configuration of the pump 16 is representatively illustrated. In this configuration, the accumulator device 68 is not used. Instead, the control module 90 operates to connect the chamber 58 via the line 62 to the desired one of the chambers 86, 88 when the piston 56 displaces upward, and to connect the other of the chambers 86, 88 to the chamber 58 via the line 60 when the piston displaces downward. The control module 90 may include an accumulator therein for storing pressure and fluid. In this regard, note that the control module 90 may be combined with the accumulator device 68 described above and/or may be combined with the pump device 54, if desired.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A downhole pump system, comprising:
   a primary fluid flow;
   a flow restricting device, exposed to a secondary fluid flow branched from the primary fluid flow, which variably restricts the secondary fluid flow through an opening, the opening returning the secondary fluid flow to the primary fluid flow, the restricting device vibrating in response to the secondary fluid flow, and the restricting device thereby alternately increasing and decreasing the secondary fluid flow through the opening; and
   a pump device which operates in response to vibration of the restricting device.

2. The system of claim 1, wherein the pump device includes at least one pump chamber having a volume which changes in response to vibration of the restricting device.

3. The system of claim 1, further comprising an accumulator device for storing pressure generated by the pump device.

4. The system of claim 3, wherein the accumulator device includes a first chamber connected to an output line of the pump device, and a second chamber connected to an input line of the pump device.

5. The system of claim 4, wherein the accumulator device further includes a third chamber, and first and second pistons, the first piston separating the first and third chambers, the second piston separating the second and third chambers, and a compressible fluid being contained within the third chamber.

6. The system of claim 5, wherein the accumulator device further includes a biasing device which exerts a biasing force on the second piston, thereby maintaining a pressure differential across the second piston.

7. The system of claim 1, further comprising a housing which includes an internal flow passage with a flow restriction therein upstream of the opening, the flow restriction creating a pressure differential in the internal flow passage which induces a portion of the primary fluid flow through the internal flow passage to flow into a secondary fluid flow path which comprises an annular chamber surrounding the internal flow passage, and to flow from the annular chamber through the opening to return to the internal flow passage.

8. The system of claim 7, wherein the restricting device variably restricts the secondary fluid flow from the annular chamber through the opening to the internal flow passage.

9. The system of claim 7, wherein the restricting device includes a projection which creates a pressure differential in the annular chamber in response to the secondary fluid flow through the annular chamber, the pressure differential in the annular chamber biasing the restricting device to increasingly restrict the secondary fluid flow through the opening.

10. The system of claim 9, further comprising a biasing device which applies a biasing force to the restricting device in a direction to decreasingly restrict the secondary fluid flow through the opening.

11. A downhole pump system, comprising:
    a primary fluid flow;
    a flow restricting device exposed to a secondary fluid flow branched from the primary fluid flow, the flow restricting device vibrating in response to the secondary fluid flow through an opening, the opening returning the secondary fluid flow to the primary fluid flow, the restricting device thereby alternately increasing and decreasing the secondary fluid flow through the opening, a pressure differential across the restricting device variably biasing the restricting device to increasingly restrict the secondary fluid flow through the opening, and the pressure differential alternately increasing and decreasing in response to respective alternate increasing and decreasing secondary fluid flow through the opening; and a pump device which operates in response to vibration of the restricting device.

12. The system of claim 11, further comprising a housing which includes an internal flow passage with a flow restriction therein upstream of the opening, the flow restriction creating a differential pressure in the internal flow passage which induces a portion of the primary fluid flow through the internal flow passage to flow into a secondary fluid flow path which comprises an annular chamber surrounding the internal flow passage, and to flow from the annular chamber through the opening to return to the internal flow passage.

13. The system of claim 12, wherein the restricting device variably restricts the secondary fluid flow from the annular chamber through the opening to the internal flow passage.

14. The system of claim 12, wherein the restricting device includes a projection which creates the pressure differential across the restricting device in the annular chamber in response to the secondary fluid flow through the annular chamber.

15. The system of claim 14, further comprising a biasing device which applies a biasing force to the restricting device in a direction to decreasingly restrict the secondary fluid flow through the opening.

16. The system of claim 11, wherein the pump device includes at least one pump chamber having a volume which changes in response to vibration of the restricting device.

17. The system of claim 11, further comprising an accumulator device for storing pressure generated by the pump device.

18. The system of claim 17, wherein the accumulator device includes a first chamber connected to an output line of the pump device, and a second chamber connected to an input line of the pump device.

19. The system of claim 18, wherein the accumulator device further includes a third chamber, and first and second pistons, the first piston separating the first and third chambers, the second piston separating the second and third chambers, and a compressible fluid being contained within the third chamber.

20. The system of claim 19, wherein the accumulator device further includes a biasing device which exerts a biasing force on the second piston, thereby maintaining a pressure differential across the second piston.

* * * * *